W. W. GAYLE.
PRESERVED COTTON BOLL.
APPLICATION FILED FEB. 29, 1912.
1,038,562.
Patented Sept. 17, 1912.
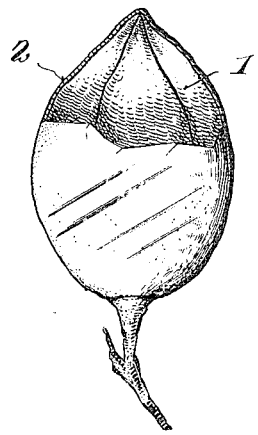
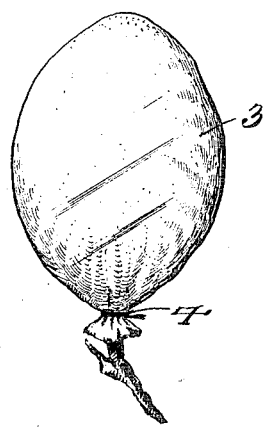
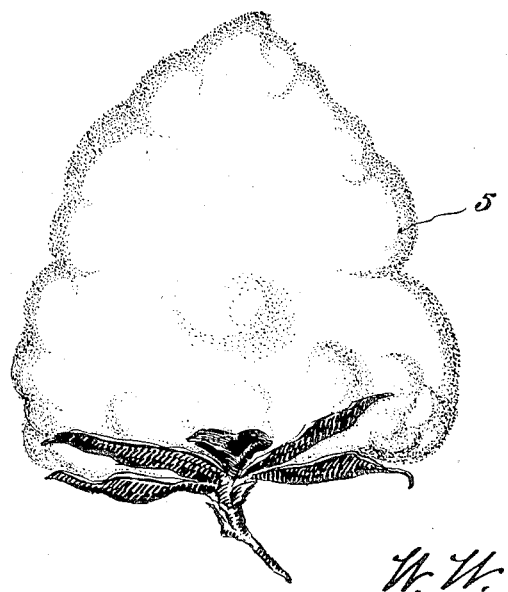

UNITED STATES PATENT OFFICE.

WALTER W. GAYLE, OF MONTGOMERY, ALABAMA.

PRESERVED COTTON-BOLL.

1,038,562.  Specification of Letters Patent.  Patented Sept. 17, 1912.

Application filed February 29, 1912. Serial No. 680,670.

*To all whom it may concern:*

Be it known that I, WALTER W. GAYLE, a citizen of the United States, residing at Montgomery, in the county of Montgomery and State of Alabama, have invented certain new and useful Improvements in Preserved Cotton-Bolls, of which the following is a specification.

The object of this invention is to provide for the delaying of the opening of cotton bolls until such time as it may suit the pleasure or convenience of those who may wish to use it in the open state for decorative purposes, for studying its development or other scientific purposes, for use in schools in instructing pupils in this phase of plant life, for experimental use in developing cotton picking machinery, or for any other purpose for which it may be used.

Cotton from bolls harvested green or unopen and allowed to open subsequently out of the field, according to my invention, is not subjected to deteriorating weather conditions, nor to the collecting of dried leaves, dirt, and other foreign matter to which it would be subjected on the growing plant in the field, thereby furnishing a better quality of unginned cotton for any use than is now generally provided.

The opening of a cotton boll, after the green boll has reached a certain stage, is not a process of growth, but is due to the drying out and warping of the hull of the boll so as to expose the inclosed cotton to the drying action of the sun's rays which cause the cotton to expand into a fluffy mass. This opening process may therefore be delayed indefinitely by harvesting the boll when green but sufficiently matured to open, and surrounding this boll by a closure which is impervious to air, so as to prevent the necessary drying out action to cause the boll to open.

In the accompanying drawing: Figure 1, indicates a green cotton boll provided with a preserving coating in accordance with one manner of carrying out my invention, the said coating being shown partially removed; Fig. 2, indicates a cotton boll inclosed in an air tight jacket such, for example, as a jacket of paraffin paper, and Fig. 3, represents the boll when open.

The closure may be of various kinds. For example, it may consist of a coating 1 of paraffin applied to the exterior of the green or unopen boll 2, by dipping the boll into melted paraffin, or otherwise, or it may consist in a coating or jacket of varnish, paint, silicate of soda or any desired compound or substance applied as a coating to the green boll, or the closure may consist of a jacket 3 of paraffin paper or other material constituting an air tight jacket for the boll, or any other suitable inclosing means which will serve the purpose of my invention. In applying the coating 1 to the bolls, I prefer that it extend well on to the stem, or it may completely cover the stem. The jacket 3 may be bound around the stem by a small wire cord 4, or other binding means.

When it is desired to have the boll open, the coating or closure is removed, and the boll dried out either by hanging it in the sun, or in a room of ordinary temperature, or in any other desired way.

In Fig. 3, 5, indicates the cotton as it appears when a boll is open.

Without limiting my invention to the specific embodiments thereof, as herein shown, what I claim is:

1. As a new article of commerce, an unopened cotton boll incased in a covering of material impervious to air and moisture, whereby the said boll is preserved in its unopened state, substantially as described.

2. As a new article of commerce, an unopened cotton boll incased in a coating of a substance which is impervious to air and moisture applied over the surface of the boll to preserve the same in the unopened state, substantially as described.

3. As a new article of commerce, an unopened cotton boll incased in a coating of paraffin applied over the surface of the boll to preserve the same in the unopened state, substantially as described.

In testimony whereof I affix my signature in presence of two witnesses.

WALTER W. GAYLE.

Witnesses:
S. C. DUCKETT,
C. E. DELL.